(12) United States Patent
Shats et al.

(10) Patent No.: US 6,209,058 B1
(45) Date of Patent: Mar. 27, 2001

(54) CACHE MANAGEMENT FOR DATA TRANSFER CONTROL FROM TARGET DISK AREAS

(75) Inventors: Serge Shats, Palo Alto; Iouri Bagachev, Sunnyvale; Luong-Duc Bui, Milpitas, all of CA (US)

(73) Assignee: Quantum Corp., Milpitas, CA (US)

( * ) Notice: Subject to any disclaimer, the term of this patent is extended or adjusted under 35 U.S.C. 154(b) by 0 days.

(21) Appl. No.: 09/239,038

(22) Filed: Jan. 27, 1999

(51) Int. Cl.[7] .............................. G06F 12/00; G06F 13/00
(52) U.S. Cl. ........................ 711/113; 711/112; 360/71; 360/72.1; 360/72.3
(58) Field of Search .................................. 711/113, 112; 360/71, 72.1, 72.3

(56) References Cited

U.S. PATENT DOCUMENTS

| 4,466,059 | * | 8/1984 | Bastian et al. | 711/122 |
| 4,583,166 | * | 4/1986 | Hartung et al. | 711/113 |
| 5,084,791 | * | 1/1992 | Thanos et al. | 360/77.04 |
| 5,465,343 | * | 11/1995 | Henson et al. | 711/112 |

* cited by examiner

*Primary Examiner*—Do Yoo
*Assistant Examiner*—Hong Kim
(74) *Attorney, Agent, or Firm*—Michael Zarrabian

(57) ABSTRACT

A method of data transfer in a cache system comprising a cache buffer including a plurality of data blocks for storing data, and a cache manager for retrieving data from a disk drive and storing the data into the cache buffer. The disk drive includes a data disk having a plurality of concentric data tracks thereon, a spindle motor for rotating the data disk, and a transducer supported by a carrier for positioning the transducer over individual data tracks to write data thereto or read data therefrom. In one embodiment, a method of data transfer in response to a request for retrieving a set of data blocks from the selected track, comprises the steps of: (a) defining a data segment on the selected track, wherein the data segment comprises, in sequence, a pre-fetch data area, a fetch data area comprising said set of data blocks, and a post-fetch data area; (b) determining a landing position of the transducer over the selected track relative to the data segment; and (c) controlling transfer of data from the data segment to the cache buffer based on said landing position relative to the data segment in maximize the data read from the data segment without increasing rotational latency.

62 Claims, 9 Drawing Sheets

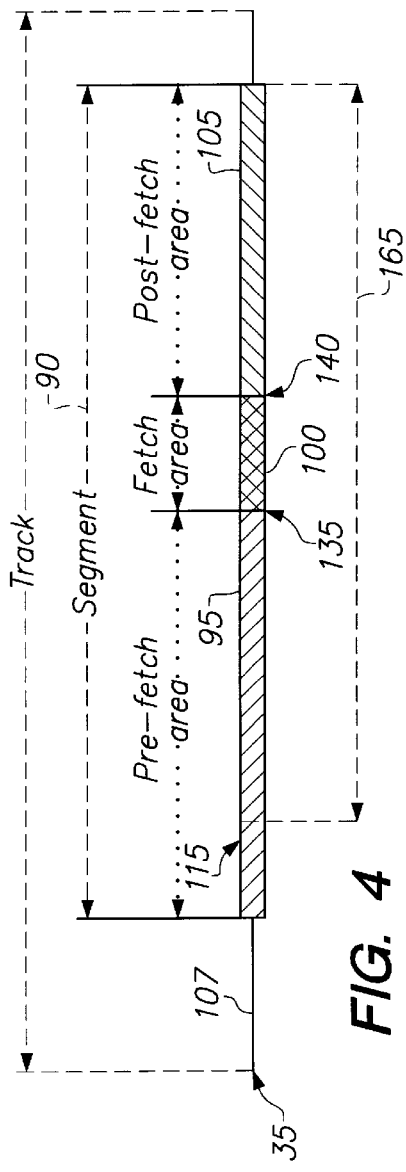
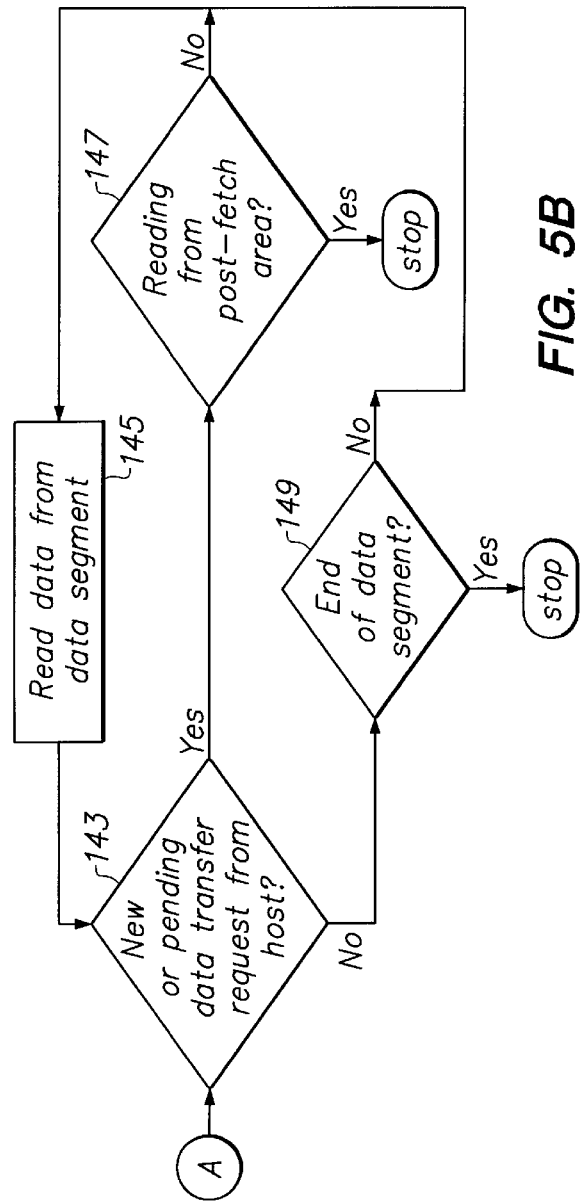
FIG. 4
FIG. 5B

CACHE MANAGEMENT FOR DATA TRANSFER CONTROL FROM TARGET DISK AREAS

FIELD OF THE INVENTION

The present invention relates generally to cache systems, and, more particularly, to a cache manager for transferring data between a data disk and a cache buffer.

BACKGROUND

A cache buffer is a high speed memory buffer inserted between a host system and a storage device, such as a disk drive, to store those portions of the disk drive data currently in use by the host. Since the cache is several times faster than the disk drive, it can reduce the effective disk drive access time. A typical disk drive includes a data disk having a plurality of concentric data tracks thereon, a spindle motor for rotating the data disk, and a transducer supported by an actuator controlled carrier for positioning the transducer over the data tracks.

A firmware cache manager controls transfer of data from the disk drive into the cache buffer, and manages the data stored in the cache buffer. A typical cache manager utilizes a cache directory containing data block memory addresses, and control bits for cache management and access control. The cache manager searches the cache directory to fetch and store data blocks in the cache buffer, and uses a replacement strategy to determine which data blocks to retain in the cache buffer and which to discard.

In response to a data read request from a host, the cache manager directs the actuator to position the transducer over a selected data track containing the requested data. However, reading data is delayed until the portion of the selected track containing the requested data rotates under the transducer. This delay degrades cache performance and increases data transfer response time.

In order to increase the hit ratio in the cache buffer, typical cache managers utilize a read-ahead strategy in retrieving the requested data from the selected track. The cache manger defines a data segment on the selected track, including a fetch area containing the requested data followed by a post-fetch data area. The cache manager first reads the requested data from the fetch area and then continues reading ahead to the end of the post-fetch area unless interrupted by another data transfer request.

To store the retrieved data into the cache buffer, the cache manager allocates and trims a cache segment in the cache buffer, comparable in size to that of data segment on the selected track. However, in doing so, the cache manager effectively discards all data in the allocated cache segment before reading any data from the selected track. Such an allocation and trimming method drastically reduces the hit ratio of the cache system and results in performance degradation. Since reading data from the post-fetch data area of the data segment must be interrupted to service any subsequent data transfer request, in many instances, only a portion of the data in the post-fetch area is retrieved and stored in a corresponding portion of the cache segment. As such, only a portion of the data in the cache segment is actually overwritten, and the pre-existing data in the remaining portion of the cache segment need not have been discarded. Any future reference to the pre-existing data results in a cache miss, requiring the cache manager to access the disk and retrieve that data again. However, disk access delays severely degrade the performance of the cache system and result in general degradation of the host performance.

There is, therefore, a need for a method of data transfer in a cache system which increases the cache hit ratio without degrading the cache performance due to disk access delays.

SUMMARY

The present invention satisfies these needs. In one embodiment, the present invention provides a method of data transfer in a cache system comprising a cache buffer including a plurality of data blocks for storing data, and a cache manager for retrieving data from a disk drive and storing the data into the cache buffer. The disk drive includes a data disk having a plurality of concentric data tracks thereon, a spindle motor for rotating the data disk, and a transducer supported by a carrier for positioning the transducer over individual data tracks to write data thereto or read data therefrom.

In one embodiment, a method of data transfer in response to a request for retrieving a set of data blocks from the selected track, comprises the steps of: (a) defining a data segment on the selected track, wherein the data segment comprises, in sequence, a pre-fetch data area, a fetch data area comprising said set of data blocks, and a post-fetch data area; (b) determining a landing position of the transducer over the selected track relative to the data segment; and (c) controlling transfer of data from the data segment to the cache buffer based on said landing position relative to the data segment. If said landing position is outside the data segment, data transfer includes delaying reading data from the data segment until the pre-fetch data area rotates under the transducer, thereafter commencing reading data from the pre-fetch area, otherwise, commencing reading data from said landing position in the data segment without delay.

If the landing position is within the postfetch area, the data transfer further includes continuing reading data from the data segment until the end of the data segment, and thereafter, ceasing reading data from the data segment until the beginning of the data segment rotates under the transducer, then commencing reading data from the beginning of the data segment to at least the end of the fetch area. If the landing position in the data segment is at or before the beginning of the fetch area, data transfer further includes continuing reading data from said landing position to at least the end of the fetch data area. If the landing position is within the fetch data area, data transfer further includes continuing reading data from the data segment until the end of the data segment, and thereafter, ceasing reading data from the data segment until the beginning of the data segment rotates under the transducer, then commencing reading data from the beginning of the data segment to at least said landing position within the fetch data area.

The size of the pre-fetch data area is selected as a function of the size of the cache buffer to maximize a hit ratio of the data in the cache buffer. Similarly, the size of the post-fetch data area as a function of the size of the cache buffer to maximize a hit ratio of the data in the cache buffer. Storing the retrieved data in the cache buffer according to the present invention includes: (a) allocating a cache segment in the cache buffer for storing data read from the data segment, (b) overwriting at least a portion of the cache segment with data read from the data segment, and (c) deallocating any remaining portion of the cache segment not overwritten with data from the data segment. The step of allocating the cache segment can comprise selecting a size for the cache segment at most equal to the size of the data segment.

In another embodiment, a method of data transfer in response to a request for retrieving a set of data blocks from the selected track, includes the steps of: (a) defining a data segment comprising, in sequence, a pre-fetch data area spanning a portion of a preceding track to the selected track and a portion of the selected track, a fetch data area comprising said set of data blocks on the selected track, and a post-fetch data area on the selected track, (b) determining a landing position of the transducer over the selected track relative to the data segment, and (c) controlling transfer of data from the data segment to the cache buffer based on said landing position relative to the data segment. If said landing position is inside the data segment, data transfer includes commencing reading data from said landing position in the data segment without delay. Otherwise, data transfer includes positioning the transducer over said preceding track, determining the position of the transducer over the preceding track relative to the data segment, determining if the transducer position is within the pre-fetch area, and if so, commencing reading data from said transducer position in the pre-fetch area without delay, otherwise, delaying reading data from the data segment until the pre-fetch data area rotates under the transducer, thereafter commencing reading data from the pre-fetch area.

If said landing position in the selected track is at or before the beginning of the fetch area, data transfer further includes reading data from said landing position to at least the end of the fetch data area. If said landing position is within or after the fetch area in the data segment, data transfer further includes: continuing reading data from the data segment until the end of the data segment, thereafter, positioning the transducer over said preceding track, determining the position of the transducer over the preceding track relative to the data segment, if the transducer position is within the pre-fetch area, commencing reading data from said transducer position in the pre-fetch area without delay, otherwise, delaying reading data from the data segment until the pre-fetch data area rotates under the transducer, thereafter commencing reading data from the pre-fetch area. Reading data from the pre-fetch data area further comprises continuing reading data from the data segment to at least said landing position in the fetch area. Reading data from the pre-fetch data area further comprises continuing reading data from the data segment to at least the end of the fetch data area.

Yet in another embodiment, a method of data transfer in response to a request for retrieving a set of data blocks from the selected track, comprises the steps of: (a) defining a data segment comprising, in sequence, a pre-fetch data area on the selected track, a fetch data area comprising said set of data blocks on the selected track, and a post-fetch data area spanning a portion of the selected track and a portion of a succeeding track to the selected track; (b) determining a landing position of the transducer over the selected track relative to the data segment; and (c) controlling transfer of data from the data segment to the cache buffer based on said landing position relative to the data segment. If said landing position is inside the data segment, data transfer includes commencing reading data from said landing position in the data segment without delay, otherwise, positioning the transducer over said succeeding track, determining the position of the transducer over said succeeding track relative to the data segment, determining if the transducer position is within the postfetch area, commencing reading data from said transducer position in the postfetch area without delay, otherwise, delaying reading data from the data segment until the postfetch data area rotates under the transducer, thereafter commencing reading data from the postfetch area.

If said landing position in the selected track is at or before the beginning of the fetch area, data transfer further includes reading data from said landing position to at least the end of the fetch data area. If said landing position is within or after the fetch area, data transfter further includes continuing reading data from the data segment until at least the end of the postfetch area in the selected track. Thereafter, delaying reading from the selected track until the pre-fetch data area rotates under the transducer, thereafter commencing reading data from the pre-fetch area to at least said landing position in the data segment.

In another aspect, the present invention provides a cache manager for managing data transfer between said disk drive and said cache. The cache manager comprises a logic circuit interconnected to the disk drive and to the cache buffer. The logic circuit is configured by program instructions such that in response to a request for retrieving a set of data blocks from the data disk the logic circuit performs the steps of the method of the present invention described above.

DRAWINGS

These and other features, aspects and advantages of the present invention will become better understood with regard to the following description, appended claims and accompanying drawings where:

FIG. 4 shows a diagram of a data disk track illustrated in a linear fashion, including a data segment defined thereon according to the an embodiment of the present invention;

FIGS. 5A and 5B show a flowchart illustrating example data transfer method in a cache system according to the present invention;

DESCRIPTION

Figure 1:
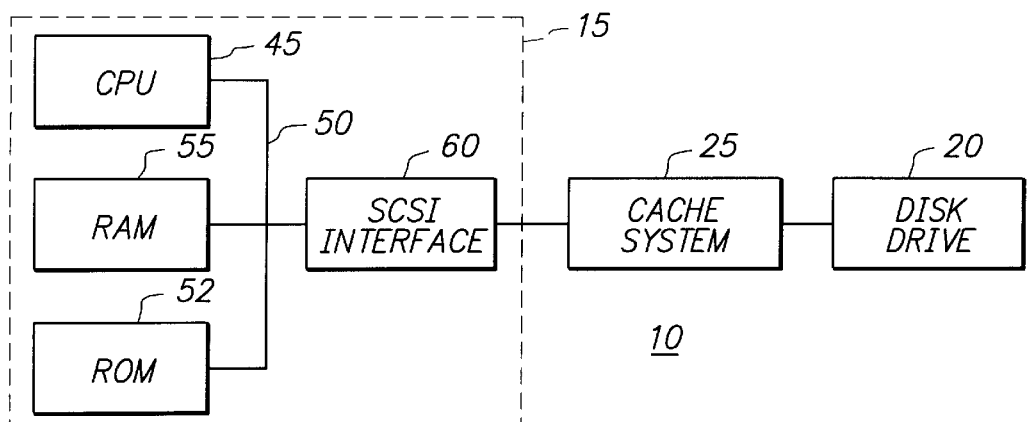
FIG. 1 shows a block diagram of an example computer architecture in which the present invention can be implemented.

FIG. 1 shows a block diagram of an example computer system 10 in which a method embodying aspects of the present invention can be implemented. The computer system 10 typically includes a host 15 and a storage device, such as a disk drive 20, interconnected via a cache system 25. The cache system 25 is utilized to manage transfer of data between the host 15 and the disk drive 20 according to the present invention. As described further below in conjunctions with FIG. 11, the disk drive 20 comprises a data disk 30 having a plurality of concentric data tracks 35 thereon, a spindle motor 40 for rotating the data disk 30, and a transducer 42 supported by a carrier 44 for selectively positioning the transducer 42 over individual data tracks 35 to write data thereto or read data therefrom. As those skilled in the art will recognize, the present invention is capable of being implemented in a system having other storage devices. Additionally, as shown in FIG. 1, the host 15 generally refers to a host/SCSI interface, which one skilled in the art will recognize to include, for example, a CPU 45 interconnected via a bus 50 to a ROM 52, a RAM 55 and a SCSI interface 60.

Figure 2:
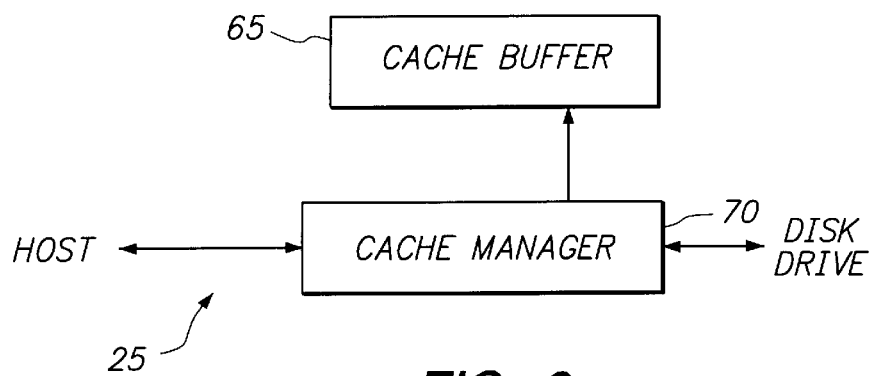
FIG. 2 shows a block diagram of a cache system including a cache buffer and a cache manager according to the present invention.

Referring to FIG. 2, the cache system 25 includes a cache buffer 65 and a cache manager 70 for storing data into, and retrieving data from, the cache buffer 65. In one aspect, the present invention provides a method of managing the data in the cache buffer 65, and transferring data between the cache buffer 65 and the disk drive 20 implemented into the cache manager 70. The method of the present invention can be used to respond to read commands from the host 15 by reading data from data tracks 35 of the disk drive 20 and storing the data in the cache buffer 65.

Figure 3:
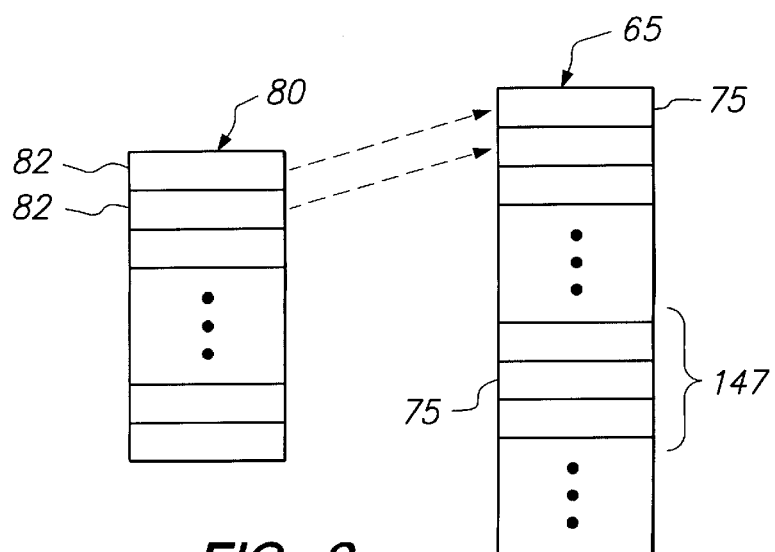
FIG. 3 shows a block diagram of a cache buffer organized into data blocks, and an embodiment of a cache directory for managing transfer of data into and out of the cache buffer.

Referring to FIG. 3, the cache buffer 65 comprises a plurality of data blocks 75 for storing data. To manage the data blocks 75 in the cache buffer 65 and the data stored therein, a cache directory 80 including entries 82 having data block memory addresses, and control bits for cache management and access control, is utilized. The cache manager 70 searches the cache directory 80 to fetch and store data in the cache buffer 65, and uses a replacement strategy to determine which data blocks to retain in the cache buffer 65 and which to discard.

Figure 5A:
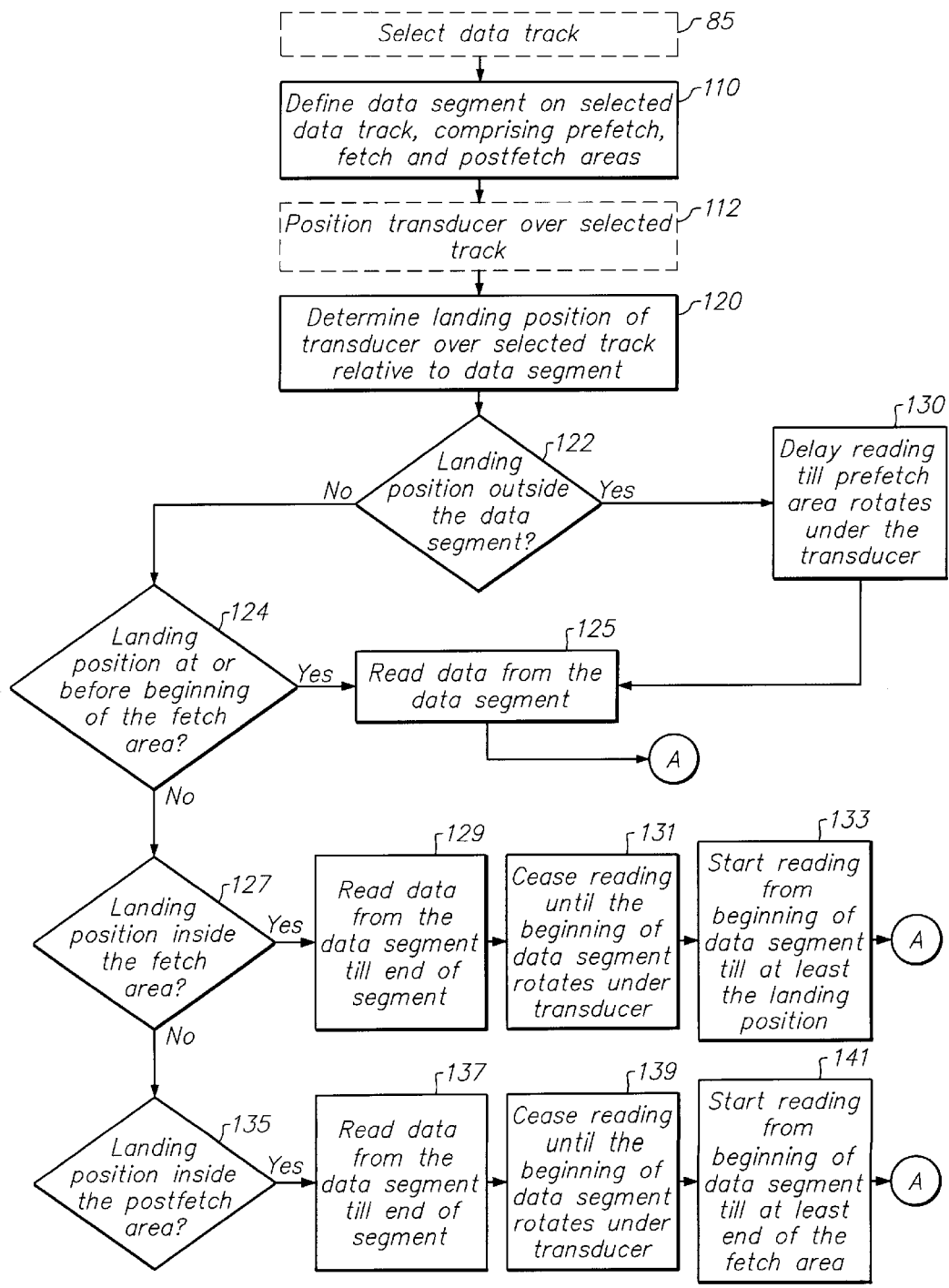

In response to a read request from the host 15, the cache manager 70 utilizes a read-ahead data transfer method according to the present invention to retrieve a set of requested data blocks 75 from one or more data tracks 35 on the data disk 30. FIG. 4 shows a diagram of a data track 35 illustrated in a linear fashion. Referring to FIG. 5A, an example flow chart of an embodiment of the method of data transfer from the data track 35 includes the step of: selecting a data track 35 on the data disk 30 where said set of data blocks 75 reside (step 85); defining a data segment 90 on the selected track 35, wherein the data segment 90 comprises, in disk rotation sequence, a pre-fetch data area 95, a fetch data area 100 having a starting boundary 135 and an ending boundary 140 with said set of data blocks 75 therebetween, and a post-fetch data area 105 (step 110); directing the carrier 44 to position the transducer 42 over the selected track 35 (step 112); determining a landing position 115 of the transducer 42 over the selected track 35 relative to the data segment 90 (step 120); if said landing position 115 is outside the data segment 90 (step 122), delaying reading data from the data segment 90 until the pre-fetch data 95 area rotates under the transducer 42 (step 130), thereafter commencing reading data from the pre-fetch area 95 (step 125). Although in FIG. 4 the landing position 115 is shown inside the pre-fetch area 95, the landing position 115 can be anywhere along the selected track 35.

If in step 122 above, said landing position 115 is inside the data segment 90, reading data from said landing position 115 in the data segment 90 begins without delay as follows. If the landing position 115 in the data segment 90 is at or before the beginning of the fetch area 100 (step 124), transfer of data further comprises continuing reading data from said landing position 115 in the data segment 90 to at least the end of the fetch data area 100 (step 125). If the landing position 115 in the data segment 90 is inside the fetch data area 100 (step 127), transfer of data further comprises: continuing reading data from the data segment 90 until the end of the data segment 90 (step 129), ceasing reading data from the selected track 35 until the beginning of the data segment 90 rotates under the transducer 42 (step 131), then commencing reading data from the pre-fetch area 95 at the beginning of the data segment 90 to at least said landing position 115 within the fetch data area 100 (step 133). If in step 122 above, the landing position 115 is within the postfetch area 105 (step 135), transfer of data further comprises: continuing reading data from the post-fetch area 105 in the data segment 90 until the end of the data segment 90 (step 137), ceasing reading data from the data segment 90 until the beginning of the data segment 90 rotates under the transducer (step 139), then commencing reading data from the pre-fetch area 95 at the beginning of the data segment 90 to at least the end of the fetch area 100 (step 141).

Referring to FIG. 5B, after all the requested data in the fetch area 100 has been retrieved, reading data from the data segment 90 can stop to service any pending or incoming additional data requests from the host 15. Otherwise, reading data can continue to retrieve maximum amount of data from the data segment 90 based on the landing position 115. For example, if the landing position 115 is in the pre-fetch area 95 as shown in FIG. 4, reading data from the data segment 90 continues until all data from the fetch area 100 is retrieved (steps 145, 148), and then interrupted to process said further data request (step 143). Otherwise, reading data can continue to retrieve maximum amount of data from the data segment 90 based on the landing position 115 (steps 145, 149).

As such, according to the present invention, reading data from the data segment 90 begins as soon as the transducer 42 is over the data segment 90. This allows as much data to be read from the data segment 90 while the data segment 90 rotates under the transducer 42. A read-ahead method according to the present invention does not degrade the response time of the cache system 25 as compared to conventional read-ahead methods. Therefore, the method of the present invention allows transferring more read-ahead data from the data disk 30 to the cache buffer 65 in the same time period as is possible with the aforementioned conventional methods.

Figure 6A:
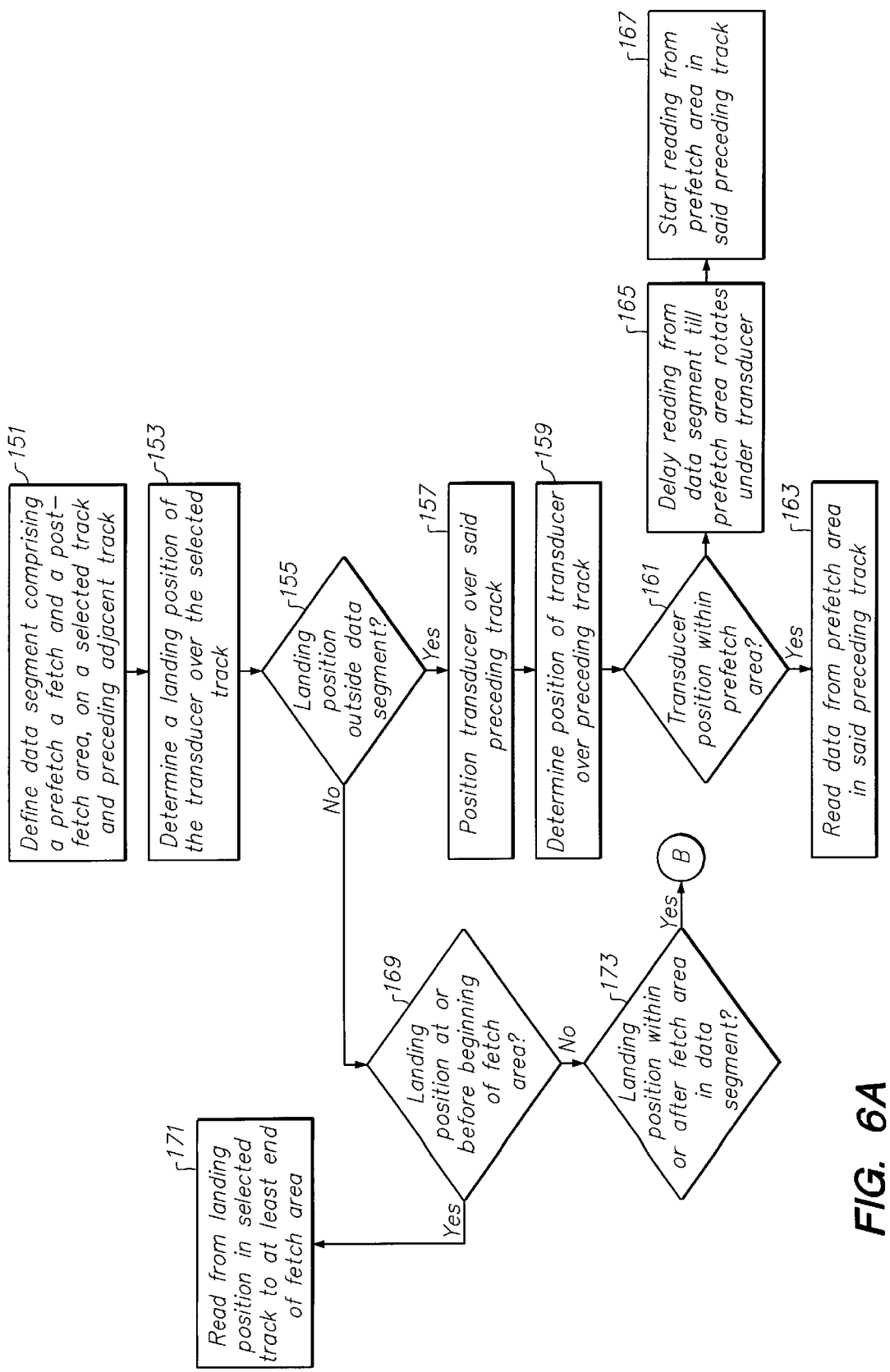
FIGS. 6A and 6B show a flowchart illustrating another example data transfer method in a cache system according to the present invention.
Figure 6B:
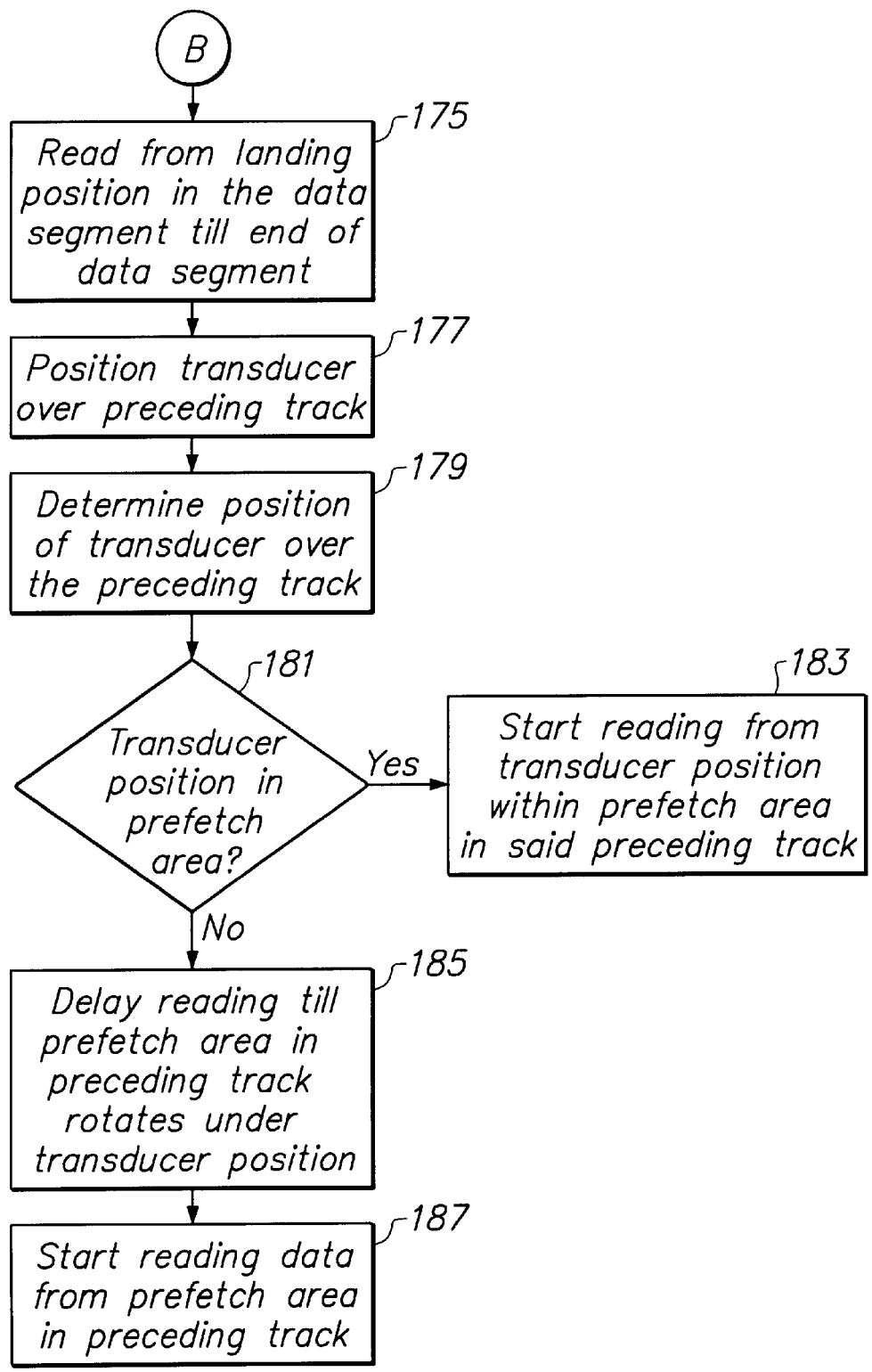
Figure 7A:
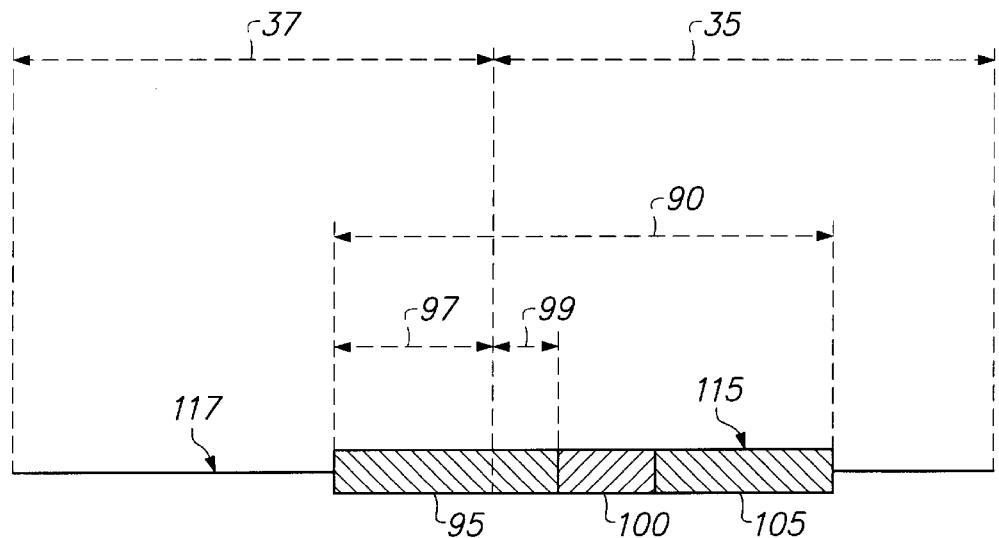
FIG. 7A shows a diagram of two adjacent data disk tracks illustrated in a linear fashion, including a data segment defined thereon according to the method of FIGS. 6A–6B.

Referring to FIGS. 6A–6B, in another embodiment, a method of data transfer in response to a request for retrieving a set of data blocks from the selected track 35, comprises the steps of: defining a data segment 90 comprising, in sequence, a pre-fetch data area 95 having a first segment 97 spanning a portion of a preceding track 37 adjacent to the selected track 35 and a second segment 99 spanning a portion of the selected track 35, a fetch data area 100 comprising said set of data blocks on the selected track 35, and a post-fetch data area 105 on the selected track 35 as shown in FIG. 7A (step 151); and determining a landing position 115 of the transducer 42 over the selected track 35 relative to the data segment 90 (step 153). Although the preceding track 37 is shown and described herein as adjacent to the selected track 35, the present invention is equally applicable to cases where the preceding track 37 is not adjacent to the selected track 35.

Data transfer takes place based on position of said landing position 115 in the selected track 35 relative to the data segment 90. If said landing position 115 is outside the data segment 90 (step 155), data transfer further comprises the steps of: positioning the transducer 42 over said preceding track 37 (step 157), determining a position 117 of the transducer 42 over the preceding track 37 relative to the data segment 90 (step 159), if the transducer position 117 is within the pre-fetch area 95 in the preceding track 37 (step 161), commencing reading data from said transducer position 117 within the pre-fetch area 95 in the preceding track 37 (step 163), otherwise, delaying reading data from the preceding track 37 until the pre-fetch data area 95 in the preceding track 37 rotates under the transducer 42 (step 165), thereafter, commencing reading data from the pre-fetch area 95 in the preceding track 37 (step 167). Although in FIG. 7A, the landing position 115 is shown inside the post-fetch area 105 in the selected track 35, and the transducer position 117 is shown outside the data segment 90 in the preceding track 37, the landing position 115 and the transducer position 117 can be anywhere along the tracks 35 and 37, respectively.

The above steps are particularly useful when the fetch area 100 in the data segment 90 is close to the beginning of the selected track 35. In that case, the size of the second segment 99 of the pre-fetch area 95 in the selected track 35 is small. Since the landing position 115 is always on a data track where a requested set of data blocks reside, if in step 155 the landing position 115 on the selected track 35 is after the data segment 90, delaying reading data until the second segment 99 of the pre-fetch area 95 rotates under the transducer 42, only provides a limited amount of read-ahead data stored in said segment 99 before the fetch area 100. Therefore, instead of reading data from the selected track 35, the transducer is positioned over the preceding track 37, whereby at least a portion of the first segment 97 of the pre-fetch area 95 can be read-ahead from the previous track 37. Thereafter, reading data proceeds into the selected track 35 wherein data in the second segment 99 of the pre-fetch area 95 is read ahead, before reading the requested data blocks from the fetch area 100. This technique generally increases the amount of read-ahead data without increasing the rotational latency for performing the read.

If in step 155, said landing position 115 in the selected track 35 is inside the data segment 90, reading data from said landing position 115 in the data segment 90 begins without delay as follows. If said landing position 115 is at or before the beginning of the fetch area 100 (step 169), transfer of data further comprises reading data from said landing position 115 to at least the end of the fetch data area 100 (step 171). If said landing position 115 is within or after the fetch data area 100 in the data segment 90 (step 173), transfer of data further comprises the steps shown in FIG. 6B as follows: reading data from the landing position 115 in the fetch area 100 until the end of the data segment 90 (step 175), thereafter, positioning the transducer 42 over said preceding track 37 (step 177), determining a position 117 of the transducer 42 over the preceding track 37 relative to the data segment 90 (step 179), if the transducer position 117 is within the prefetch area 95 (step 181), commencing reading data from said transducer position 117 in the prefetch area 95 in the preceding track 37 (step 183), otherwise, delaying reading data from the data segment 90 in the preceding track 37 until the pre-fetch data area 95 rotates under the transducer 42 in the preceding track 37 (step 185), thereafter, commencing reading data from the pre-fetch area 95 in the preceding track 37 (step 187). Reading data from the prefetch data area 95 in steps 183, 187 can further comprise continuing reading data from the data segment 90 to at least the end of the fetch data area 100.

Therefore, according to the above steps, if the landing position 115 is in the data segment 90 on the selected track 35, reading data from the data segment commences without delay. If the landing position if in or after the fetch area 100, reading data continues to the end of the data segment 90. Thereafter, instead of delaying reading until the second segment 99 of the post-fetch area 95 rotates under the transducer 42, the transducer 42 is positioned over the preceding track 37, whereby at least a portion of the first segment 97 of the pre-fetch area 95 can be read ahead from the previous track 37. Thereafter, reading data proceeds into the selected track 35 wherein data in the second segment 99 of the pre-fetch area 95 is read ahead. This technique generally increases the amount of read-ahead data without increasing the rotational latency for performing the read.

Figure 8:
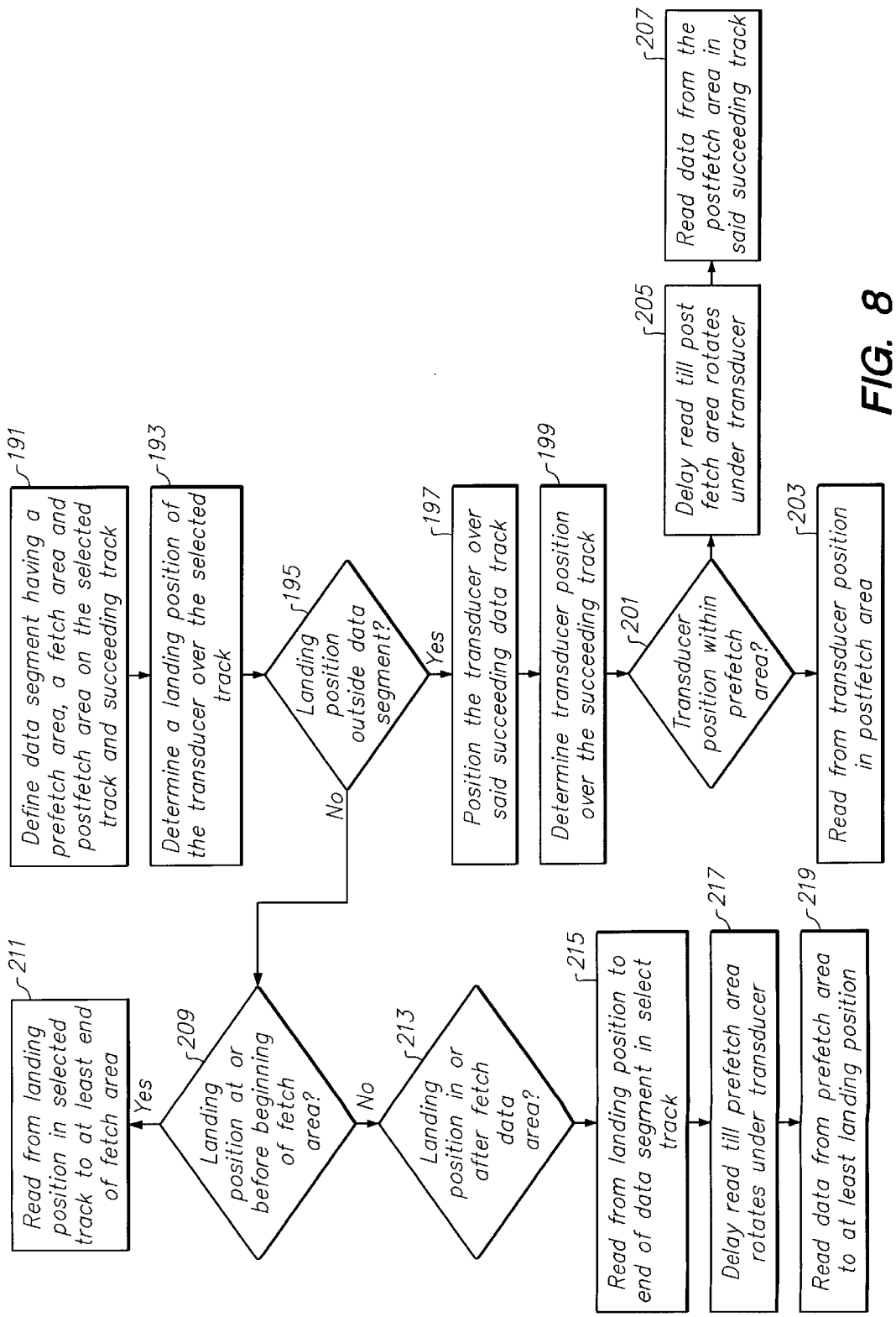
FIG. 8 shows a flowchart illustrating another example data transfer method in a cache system according to the present invention.
Figure 9A:
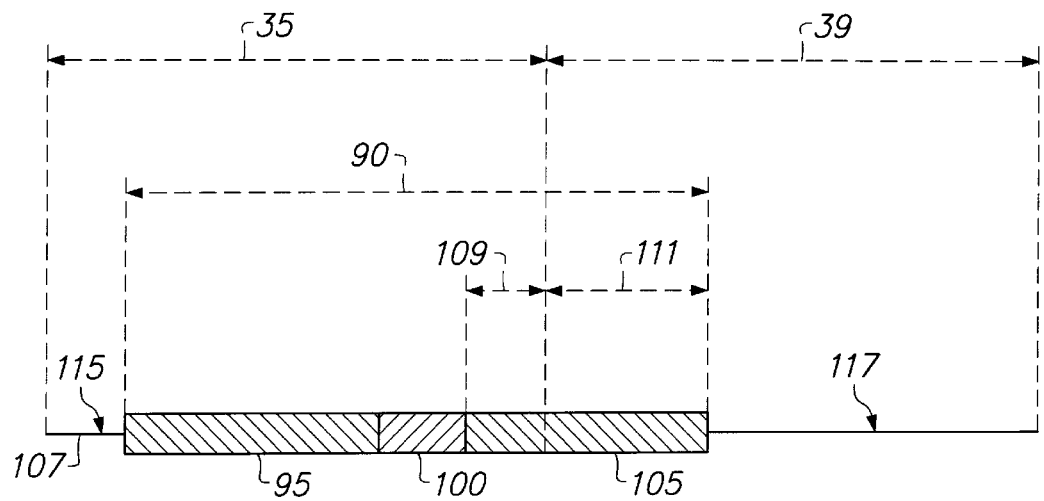
FIG. 9A shows a diagram of two data disk tracks illustrated in a linear fashion, including a data segment defined thereon according to the method of FIG. 7.

Referring to FIG. 8, in another embodiment, a method of data transfer in response to a request for retrieving a set of data blocks from the selected track 35, comprises the steps of: defining a data segment 90 comprising, in sequence: a pre-fetch data area 95 on the selected track 35, a fetch data area 100 comprising said set of data blocks on the selected track 35, a post-fetch data area 105 having a first segment 109 in a portion of the selected track 35 and a second segment 111 in a portion of a succeeding track 39 adjacent to the selected track 35 as shown in FIG. 9A (step 191), and determining a landing position 115 of the transducer 42 over the selected track 35 relative to the data segment 90 (step 193). Although the succeeding track 39 is shown and described herein as adjacent to the selected track 35, the present invention is equally applicable to cases where the succeeding track 39 is not adjacent to the selected track 35.

Data transfer takes place based on position of said landing position 115 in the selected track 35 relative to the data segment 90. If said landing position 115 is outside the data segment 90 (step 195), then positioning the transducer 42 over said succeeding track 39 (step 197), determining a position 117 of the transducer 42 over said succeeding track 39 relative to the data segment 90 (step 199), if the transducer position 117 is within the post-fetch area 105 in the succeeding track 39 (step 201), commencing reading data from said transducer position 117 in the second segment 111 of the post-fetch area 105 without delay (step 203), otherwise, delaying reading data from the data segment 90 in the succeeding track 39 until the beginning of the second segment 111 of the post-fetch data area 105 rotates under the transducer 42 (step 205), thereafter commencing reading data from the second segment 111 of the post-fetch area 105 (step 207). Although in FIG. 9A, the landing position 115 is shown outside the data segment 95 in the selected track 35, and the transducer position 117 is shown outside the data segment 90 in the succeeding track 39, the landing position 115 and the transducer position 117 can be anywhere along the tracks 35 and 39, respectively.

If in step 195 above, said landing position 115 is inside the data segment 90, reading data from the landing position 115 in the data segment 90 begins without delay as follows. If said landing position 115 is at or before the beginning of the fetch area 100 (step 209), transfer of data further comprises reading data from said landing position 115 to at least the end of the fetch data area 100 (step 211). If said landing position 115 in the data segment 90 is within or after the fetch data area 100 (step 213), transfer of data further comprises the steps of: continuing reading data from the landing position 115 in the data segment 90 to the end of the first segment 109 of the post-fetch area 105 in the selected track 37 (step 215), delaying reading from the selected track 35 until the pre-fetch data area 95 rotates under the transducer 42 (step 217), thereafter commencing reading data from the pre-fetch area 95 to at least said landing position 115 (step 219). Step 219 can further include reading data from the data segment 90 to the end of the post-fetch area 105 in the succeeding track 39. Further, in steps 203 and 207 above, after reading data from the post-fetch area 105 in the succeeding track 39 is complete, the transducer 42 is positioned over the selected track 25, and data read therefrom according to steps similar to steps 209 through 219 above.

Because the pre-fetch area 95 or the post-fetch area 105 can be long, such as 100 sectors, the probability of the data segment 90 crossing the boundaries of the selected track 35 into the adjacent tracks 37 and 39 can be high. Therefore, read-ahead is not limited to the selected track 35 and is performed on the adjacent tracks 37 and 39 as well. This allows reading ahead as much data from the data segment 90 before and after the fetch area 100 without rotational latency. Therefore, according to the present invention, switching from the landing position 115 in the selected track 35 to the preceding track 37 or the succeeding track 39 takes place if doing so allows reading ahead maximum data from the data segment 90 without increasing the rotational latency.

Switching the position of the transducer 42 from one track to another can be performed in several ways. For example positioning the transducer 42 over said adjacent tracks 37 and 39 can comprise directing the carrier 44 to position the transducer 42 over said tracks 37 or 39. In another, the transducer 42 can comprise two or more read-write heads, and the step of positioning the transducer 42 over the adjacent tracks 37 or 39 can comprise switching data transfer from a read-write head positioned over the selected track 35, to a read-write head positioned over the preceding track 37 or the succeeding track 39, without directing the carrier to move the transducer. Further, some disk drives include means for predicting the landing position of the transducer 42 on the selected track 35, in which case, instead of positioning the transducer 42 over the selected track 35 and then moving the transducer 42 or switching to adjacent read-write heads according to the above steps, the transducer 42 is initially placed over an adjacent track 37 or 39, or a read-write head over an adjacent track 37 or 39 is initially selected.

Figure 7B:
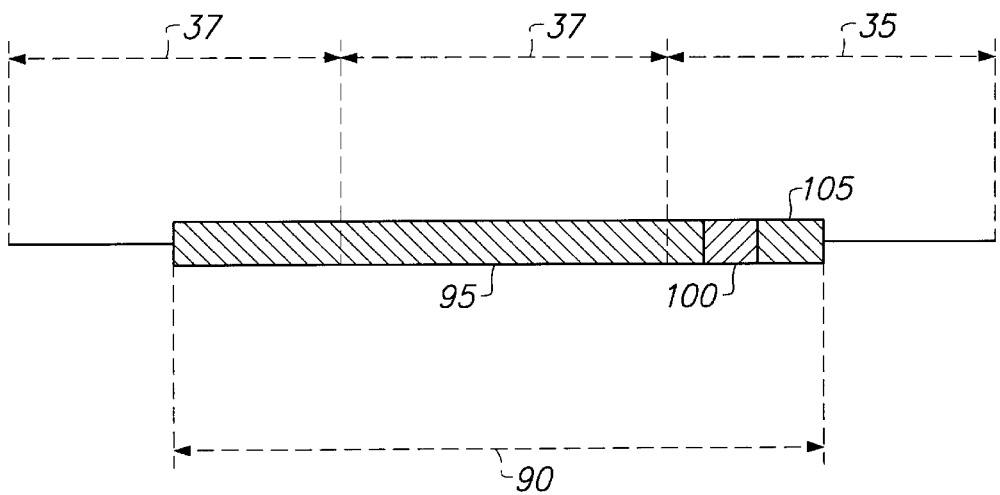
FIG. 7B shows a diagram of three data disk tracks illustrated in a linear fashion, including a data segment defined thereon according to the method of FIGS. 6A–6B.
Figure 9B:
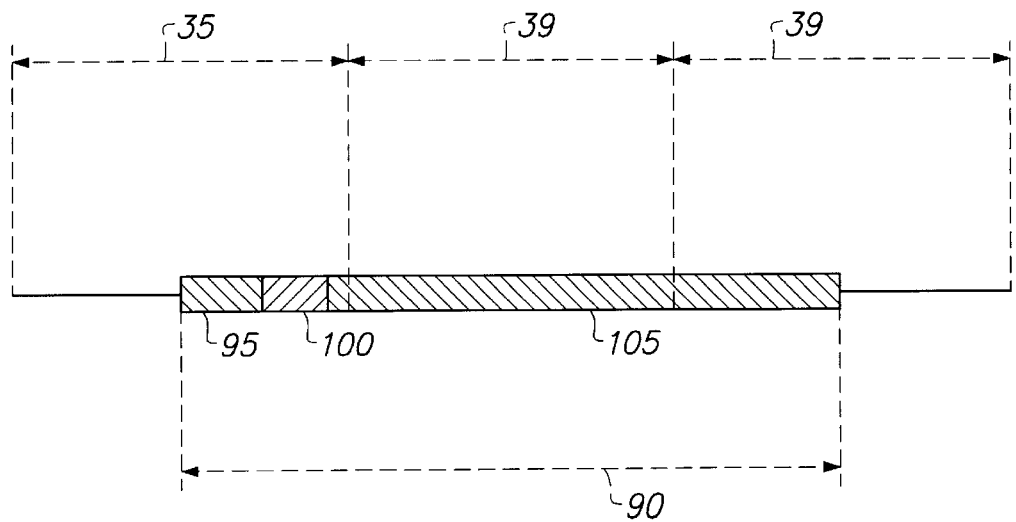
FIG. 9B shows a diagram of three data disk tracks illustrated in a linear fashion, including a data segment defined thereon according to the method of FIG. 7.

Although in the above embodiments of the present invention, the data segment 90 spans over two data tracks, the method of the present invention is equally applicable to cases where the data segment 90 spans three or more data tracks, wherein the fetch area 100 is on the selected track 35, and either or both of the pre-fetch and post-fetch areas 95, 105 span over two or more tracks preceding and succeeding the selected track 35, respectively. For example, FIG. 7B shows the data segment 90 spanning a portion of the selected track 35 and two preceding tracks 37, and FIG. 9B shows the data segment 90 spanning a portion of the selected track 35, and two succeeding track 39.

Due to general locality of reference to data on the selected track 35 by the host 15, there is a high probability that the data read from the data segment 90, such as data in pre-fetch area 95, and stored in the cache buffer 65, can be utilized by the host 15 in subsequent read requests. The availability of said data in the cache buffer 65 increases the hit ratio of the cache system 25 without any response time degradation.

The data areas 95, 100 and 105 within the data segment 90 can be adjacent or detached. For example, referring to FIG. 4, the pre-fetch data area 95 is adjacent to the fetch data area 100, and the fetch data area 100 is adjacent to the post-fetch data area 105. Alternatively, there can be a gap between the pre-fetch data area 95 and the fetch data area 100. Similarly, there can be a gap between the fetch data area 100 and the post-fetch data area 105. The data areas 95, 100 and 105 are shown in FIGS. 4, 7A–7B and 9A–9B in disk rotation sequence from the left to the right of the Figures. For example, in FIG. 4, the data areas 95, 100 and 105 on the data track 35 have been shown on the track 35 from left to right of FIG. 4 in the sequence in which said data areas are carried under the transducer 42 by the rotation of the data disk 30 when the transducer 42 is at a position 107 before the pre-fetch data area 95.

The size of the pre-fetch data area 95 is selected as a function of the size of the cache buffer 65 to maximize the hit ratio of the data in the cache buffer 65 without degradation of the read response time discussed above. Another factor in selecting the size of the pre-fetch data area 95 is the size of individual disk data tracks because a longer track size provides more potential for significant read-ahead. Similarly, the size of the post-fetch data area 105 is selected as function of the size of the cache buffer 65 to maximize the hit ratio of the data in the cache buffer 65. For example, where a data track includes 300 to 600 sectors per track, the sizes of the pre-fetch and post-fetch areas 95 and 105 are selected to be about 200 sectors each. Increasing the sizes of the pre-fetch and post-fetch area 95, 105 may not increase the cache hit ratio. As such, the amount of buffer memory in the disk drive, track size, the sizes of the pre-fetch and post-fetch areas 95, 105 and locality of reference are balanced to obtain a desired cache hit ratio.

Figure 10:
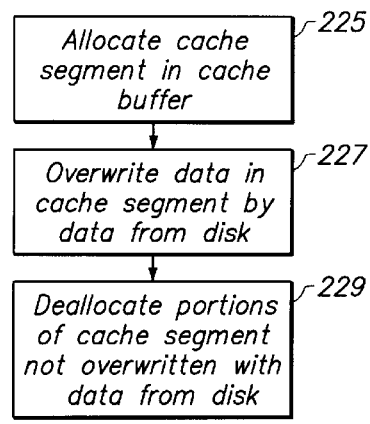
FIG. 10 shows a flowchart illustrating example replacement method in a cache system according to the present invention.

FIG. 10 shows an example flowchart of an embodiment of a replacement method according to the present invention for storing data retrieved from the data disk 30 into the cache buffer 65. Once the size of the data segment 90 is defined as described above, the method of the present invention further includes the steps of: allocating a cache segment 147 having one or more data blocks in the cache buffer 65, the cache segment 147 having a size at most equal to the size of the data segment 90 (step 225); overwriting at least a portion of the cache segment 147 with data read from the data segment 90 (step 227); and deallocating any remaining portion of the cache segment 147 not overwritten with data from the data segment 90 (step 229).

Preferably, the size of the cache segment 147 is selected by a prediction of the maximum amount of data that can be read from the data segment 90 based on the initial landing position 115 of the transducer 42 on the selected track 35. For example, referring to FIG. 4, if the landing position 115 is at or before the fetch area 100 in the data segment 90, the size of the cache segment 147 can be selected to be the size of a data area 165 in the data segment between said landing position 115 to the end of the data segment 90. If the landing position 115 is in or after the fetch area 100, the size of the cache segment 147 can be that of a data area beginning with the landing position 155 through the end of the data segment 90 and from the start of the data segment 90 to a location in the data segment 90 whereupon at least all the requested data blocks have been read from the data segment 90. Further, unlike conventional allocation methods, in the allocation process of the present invention, the existing data within the cache segment 147 is not initially designated as discarded in the cache directory. Nor is the existing data in the cache segment 147 initially physically discarded.

Once commenced, reading data from the data segment 90 continues without interruption by further data requests as described above until at least all the requested data blocks have been read from the data segment 90. Thereafter, if there are no pending or new-arriving data transfer requests, reading data from the data segment 90 can proceed until maximum amount of data is read from the data segment 90 based on the initial landing position 115 of the transducer 42 relative to the data segment 90 in the selected track 35. Otherwise, reading data from the data segment 90 is interrupted to service a new-arriving data transfer request, and any portion of the allocated cache segment 147 not overwritten with data from the data segment 90 is deallocated with the existing data therein remaining intact. Therefore, unlike in conventional cache systems, the existing data in the deallocated portion of the cache segment 147 remains available in the cache buffer 65 for use by subsequent data transfer requests referring to such data. This increases the hit ratio of a cache system 25 according to the present invention.

In another aspect, the present invention can be implemented as a cache manager comprising a computer system or a logic circuit configured by program instructions to perform the steps of the methods of the present invention. The program instructions can be implemented in a high level programming language such as C, Pascal, etc. which is then compiled into object code and linked with object libraries as necessary to generate executable code for the processor. The program instructions can also be implemented in assembly language which is then assembled into object code and linked with object libraries as necessary to generate executable code.

Figure 11:
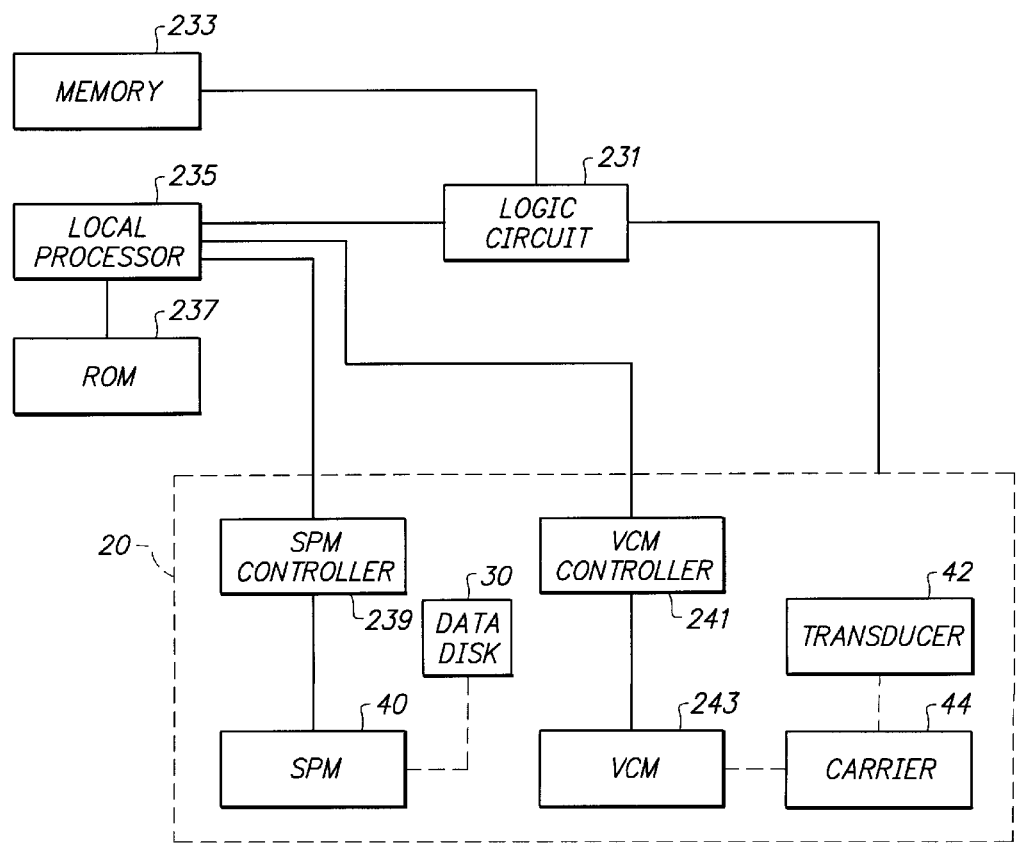
FIG. 11 shows a simplified circuit diagram of an example disk drive circuit interconnected to cache manager logic circuit in which the present invention can be implemented.

Referring to FIG. 11, preferably, a logic circuit 231 is configured by the program instructions to perform the steps of the data transfer and replacement methods of the present invention described above. The logic circuit 231 can be an Application Specific Integrated Circuit (ASIC). An ASIC is a device designed to perform a specific function as opposed to a device such as a microprocessor which can be programmed to performed a variety of functions. The circuitry for making the chip programmable is eliminated and only those logic functions needed for a particular application are incorporated. As a result, the ASIC has a lower unit cost and higher performance since the logic is implemented directly in a chip rather than using an instruction set requiring multiple clock cycles to execute. An ASIC is typically fabricated using CMOS technology with custom, standard cell, physical placement of logic (PPL), gate array, or field programmable gate array (FPGA) design methods.

The logic circuit 231 can be interconnected to a memory device 233, a microprocessor 235 with a ROM 237, and the disk drive 20. Typically, the ROM 237 includes data and program instructions for the microprocessor 235 to interact with a spindle motor controller 239 connected to the spindle motor 40 (SPM), and with a voice coil motor controller 241 connected to a voice coil motor 243 (VCM) for manipulating the carrier 44 bearing the transducer 42 in the disk drive 20. The microprocessor 235 oversees transfer of data between the host 15 and the disk drive 20 through the memory device 233. The memory device 233 can include the cache buffer 65 for storing data retrieved from the disk drive 20. The memory device 233 can also be used to store and maintain the cache directory 80. Preferably, the cache directory 80 is stored in fast local memory for efficient access by the logic circuit 231.

Other means, comprising memory devices, processors, logic circuits, and/or analog circuits, for performing the above steps are possible and contemplated by the present invention. The present invention can be used with different replacement strategies such as hardware or logical segmentation, LFU, LRU, localities or single thread mode.

Although the present invention has been described in considerable detail with regard to the preferred versions thereof, other versions are possible. Therefore, the appended claims should not be limited to the descriptions of the preferred versions contained herein.

What is claimed is:

1. In a cache system comprising a cache buffer including a plurality of data blocks for storing data, and a cache manager for transferring data into and out of the cache buffer, including retrieving data from a disk drive and storing said data into the cache buffer, the disk drive comprising a data disk having a plurality of concentric data tracks thereon, a spindle motor for rotating the data disk, and a transducer supported by a carrier for positioning the transducer over a selected data track to write data thereto or read data therefrom, a method of data transfer in response to a request for retrieving a set of data blocks from the selected track, comprising the steps of:

(a) defining a data segment on the selected track, wherein the data segment comprises, in sequence: (1) a pre-fetch data area, (2) a fetch data area comprising said set of data blocks, and (3) a post-fetch data area;

(b) determining a landing position of the transducer over the selected track relative to the data segment; and (c) controlling transfer of data from the data segment to the cache buffer based on said landing position, wherein:

(1) if said landing position is outside the data segment, delaying reading data from the data segment until the pre-fetch data area rotates under the transducer, thereafter commencing reading data from the pre-fetch area;

(2) otherwise, commencing reading data from said landing position in the data segment without delay.

2. The method of claim 1, wherein if said landing position is within the post-fetch area, the step of controlling transfer of data further comprises: (1) continuing reading data from the data segment until the end of the data segment, and (2) thereafter, ceasing reading data from the data segment until the beginning of the data segment rotates under the transducer, then commencing reading data from the beginning of the data segment to at least the end of the fetch area.

3. The method of claim 1, wherein if said landing position in the data segment is at or before the beginning of the fetch area, the step of controlling transfer of data further comprises continuing reading data from said landing position to at least the end of the fetch data area.

4. The method of claim 1, wherein if said landing position is within the fetch data area, the step of controlling transfer of data further comprises: (a) continuing reading data from the data segment until the end of the data segment, and (b) thereafter, ceasing reading data from the data segment until the beginning of the data segment rotates under the transducer, then commencing reading data from the beginning of the data segment to at least said landing position within the fetch data area.

5. The method of claim 1 further comprising the steps of:

(a) allocating a cache segment in the cache buffer for storing data read from the data segment;

(b) overwriting at least a portion of the cache segment with data read from the data segment; and (c) deallocating any remaining portion of the cache segment not overwritten with data from the data segment.

6. The method of claim 5, wherein the step of allocating the cache segment comprises selecting a size for the cache segment at most equal to the size of the data segment.

7. The method of claim 1, wherein the pre-fetch data area is adjacent to the fetch data area.

8. The method of claim 1, wherein the fetch data area is adjacent to the post-fetch data area.

9. The method of claim 1, wherein the step of defining the data segment further includes selecting a size of the pre-fetch data area as a function of the size of the cache buffer to maximize a hit ratio of the data in the cache buffer.

10. The method of claim 9, wherein the step of defining the data segment further includes selecting a size of the post-fetch data area as a function of the size of the cache buffer to maximize a hit ratio of the data in the cache buffer.

11. A cache manager for managing data transfer between a disk drive and a cache buffer including a plurality of data blocks for storing data, the data disk drive including a data disk with a plurality of concentric data tracks thereon, a spindle motor for rotating the data disk, and a transducer supported by a carrier for moving the transducer radially across the data disk to write data to or read data from the data tracks, the cache manager comprising a logic circuit interconnected to the disk drive and to the cache buffer, wherein the logic circuit is configured by program instructions such that in response to a request for retrieving a set of data blocks from the data disk, the logic circuit performs steps including:
  (a) selecting a track on the data disk where said set of data blocks reside;
  (b) defining a data segment on the selected track, wherein the data segment comprises, in sequence: (1) a pre-fetch data area, (2) a fetch data area comprising said set of data blocks, and (3) a post-fetch data area;
  (c) directing the carrier to position the transducer over the selected track;
  (d) determining a landing position of the transducer over the selected track relative to the data segment; and
  (e) controlling transfer of data from the data segment to the cache buffer based on said landing position, wherein:
    (1) if said landing position is outside the data segment, delaying reading data from the data segment until the pre-fetch data area rotates under the transducer, thereafter commencing reading data from the pre-fetch area;
    (2) otherwise, commencing reading data from said landing position in the data segment without delay.

12. The cache manager claim 11, wherein the program instructions for controlling transfer of data further comprise program instructions for determining if said landing position is within the post-fetch area, and if so: (a) continuing reading data from the data segment until the end of the data segment, and (b) thereafter, ceasing reading data from the data segment until the beginning of the data segment rotates under the transducer, then commencing reading data from the beginning of the data segment to at least the end of the fetch area.

13. The method of claim 11, wherein the program instructions for controlling transfer of data further comprise program instructions for determining if said landing position within the data segment is at or before the beginning of the fetch area, and if so, reading data from said landing position to at least the end of the fetch data area.

14. The method of claim 11, wherein the program instructions for controlling transfer of data further comprise program instructions for determining if said landing position is within the fetch data area, and if so: (a) continuing reading data from the data segment until the end of the data segment, and (b) thereafter, ceasing reading data from the data segment until the beginning of the data segment rotates under the transducer, then commencing reading data from the beginning of the data segment to at least said landing position within the fetch data area.

15. The cache manager of claim 11 further comprising program instructions for:
  (a) allocating a cache segment in the cache buffer for storing data read from the data segment;
  (b) overwriting at least a portion of the cache segment with data read from the data segment; and
  (c) deallocating any remaining portion of the cache segment not overwritten with data from the data segment.

16. The cache manager of claim 15, wherein the program instructions for allocating the cache segment comprises program instructions for selecting a size for the cache segment at most equal to the size of the data segment.

17. The cache manager of claim 11, wherein the pre-fetch data area is adjacent to the fetch data area.

18. The cache manager of claim 11, wherein the fetch data area is adjacent to the post-fetch data area.

19. The cache manager of claim 11, wherein the program instructions for defining the data segment further include program instructions for selecting the size of the pre-fetch data area as a function of the size of the cache buffer to maximize a hit ratio of the data in the cache buffer.

20. The cache manager of claim 19, wherein the program instructions for defining the data segment further include program instructions for selecting the size of the post-fetch data area as a function of the size of the cache buffer to maximize a hit ratio of the data in the cache buffer.

21. In a cache system comprising a cache buffer including a plurality of data blocks for storing data, and a cache manager for transferring data into and out of the cache buffer, including retrieving data from a disk drive and storing said data into the cache buffer, the disk drive comprising a data disk having a plurality of concentric data tracks thereon, a spindle motor for rotating the data disk, and a transducer supported by a carrier for positioning the transducer over a selected data track to write data thereto or read data therefrom, a method of data transfer in response to a request for retrieving a set of data blocks from the selected track, comprising the steps of:
  (a) defining a data segment comprising, in sequence: (1) a pre-fetch data area spanning at least a portion of at least one preceding track to the selected track and at least a portion of the selected track, (2) a fetch data area comprising said set of data blocks on the selected track, and (3) a post-fetch data area on the selected track;
  (b) determining a landing position of the transducer over the selected track relative to the data segment; and
  (c) controlling transfer of data from the data segment to the cache buffer based on said landing position, wherein:
    (1) if said landing position is inside the data segment, commencing reading data from said landing position in the data segment without delay; and
    (2) otherwise, if said landing position is outside the data segment: (i) positioning the transducer over said preceding track, (ii) determining the position of the transducer over the preceding track relative to the data segment, (iii) if the transducer position is within the pre-fetch area, commencing reading data from said transducer position in the pre-fetch area without delay, otherwise, (iv) delaying reading data from the data segment until the pre-fetch data area rotates under the transducer, thereafter commencing reading data from the pre-fetch area.

22. The method of claim 21, wherein if said landing position is within the post-fetch area, the step of controlling transfer of data further comprises: (a) continuing reading data from the data segment until the end of the data segment, (b) thereafter, positioning the transducer over said preceding track, (c) determining the position of the transducer over the preceding track relative to the data segment, (d) if the transducer position is within the pre-fetch area, commencing reading data from said transducer position in the pre-fetch area without delay, otherwise, (e) delaying reading data from the data segment until the pre-fetch data area rotates under the transducer, thereafter commencing reading data from the pre-fetch area.

23. The method of claim 22 wherein the step of reading data from the pre-fetch data area further comprises continuing reading data from the data segment to at least the end of the fetch data area.

24. The method of claim 22 wherein the step of reading data from the pre-fetch data area further comprises continuing reading data from the data segment to at least said landing position in the fetch data area.

25. The method of claim 21, wherein if said landing position in the selected track is at or before the beginning of the fetch area, the step of controlling transfer of data further comprises reading data from said landing position to at least the end of the fetch data area.

26. The method of claim 21 further comprising the steps of:
(a) allocating a cache segment in the cache buffer for storing data read from the data segment;
(b) overwriting at least a portion of the cache segment with data read from the data segment; and
(c) deallocating any remaining portion of the cache segment not overwritten with data from the data segment.

27. The method of claim 26, wherein the step of allocating the cache segment comprises selecting a size for the cache segment at most equal to the size of the data segment.

28. The method of claim 21, wherein the pre-fetch data area is adjacent to the fetch data area.

29. The method of claim 21, wherein the fetch data area is adjacent to the post-fetch data area.

30. The method of claim 21, wherein the step of defining the data segment further includes selecting a size of the pre-fetch data area as a function of the size of the cache buffer to maximize a hit ratio of the data in the cache buffer.

31. The method of claim 30, wherein the step of defining the data segment further includes selecting a size of the post-fetch data area as a function of the size of the cache buffer to maximize a hit ratio of the data in the cache buffer.

32. A cache manager for managing data transfer between a disk drive and a cache buffer including a plurality of data blocks for storing data, the data disk drive including a data disk with a plurality of concentric data tracks thereon, a spindle motor for rotating the data disk, and a transducer supported by a carrier for moving the transducer radially across the data disk to write data to or read data from the data tracks, the cache manager comprising a logic circuit interconnected to the disk drive and to the cache buffer, wherein the logic circuit is configured by program instructions such that in response to a request for retrieving a set of data blocks from the data disk, the logic circuit performs steps including:

(a) selecting a track on the data disk where said set of data blocks reside;
(b) defining a data segment comprising, in sequence: (1) a pre-fetch data area spanning at least a portion of at least one preceding track to the selected track and at least a portion of the selected track, (2) a fetch data area comprising said set of data blocks on the selected track, and (3) a post-fetch data area on the selected track;
(c) directing the carrier to position the transducer over the selected track;
(d) determining a landing position of the transducer over the selected track relative to the data segment; and
(e) controlling transfer of data from the data segment to the cache buffer based on said landing position, wherein:
  (1) if said landing position is inside the data segment, commencing reading data from said landing position in the data segment without delay; and
  (2) otherwise, if said landing position is outside the data segment: (i) positioning the transducer over said preceding track, (ii) determining the position of the transducer over the preceding track relative to the data segment, (iii) if the transducer position is within the pre-fetch area, commencing reading data from said transducer position in the pre-fetch area without delay, otherwise, (iv) delaying reading data from the data segment until the pre-fetch data area rotates under the transducer, thereafter commencing reading data from the pre-fetch area.

33. The cache manager of claim 32, wherein the program instructions for controlling transfer of data further comprise program instructions for determining if said landing position is within or after the fetch area in the data segment, and if so: (a) continuing reading data from the data segment until the end of the data segment, (b) thereafter, positioning the transducer over said preceding track, (c) determining the position of the transducer over the preceding track relative to the data segment, (d) if the transducer position is within the pre-fetch area, commencing reading data from said transducer position in the pre-fetch area without delay, otherwise, (e) delaying reading data from the data segment until the pre-fetch data area rotates under the transducer, thereafter commencing reading data from the pre-fetch area.

34. The cache manager of claim 33 wherein the program instructions for reading data from the pre-fetch data area further comprise instructions for continuing reading data from the data segment to at least the end of the fetch data area.

35. The cache manager of claim 33 wherein the program instructions for reading data from the pre-fetch data area further include instructions for continuing reading data from the data segment to at least said landing position in the fetch area.

36. The cache manager of claim 32, wherein the program instructions for controlling transfer of data further comprise instructions for determining if said landing position in the selected track is at or before the beginning of the fetch area, and if so, reading data from said landing position to at least the end of the fetch data area.

37. The cache manager of claim 35 further comprising program instructions configuring the logic circuit for:
(a) allocating a cache segment in the cache buffer for storing data read from the data segment;
(b) overwriting at least a portion of the cache segment with data read from the data segment; and
(c) deallocating any remaining portion of the cache segment not overwritten with data from the data segment.

38. The cache manager of claim 37, wherein program instructions for allocating the cache segment further comprise instructions for selecting a size for the cache segment at most equal to the size of the data segment.

39. The cache manager of claim 32, wherein the pre-fetch data area is adjacent to the fetch data area.

40. The cache manager of claim 32, wherein the fetch data area is adjacent to the post-fetch data area.

41. The cache manager of claim 32, wherein the program instructions for defining the data segment further include instructions for selecting a size of the pre-fetch data area as a function of the size of the cache buffer to maximize a hit ratio of the data in the cache buffer.

42. The cache manager of claim 41, wherein the program instructions for defining the data segment further include instructions for selecting a size of the post-fetch data area as a function of the size of the cache buffer to maximize a hit ratio of the data in the cache buffer.

43. In a cache system comprising a cache buffer including a plurality of data blocks for storing data, and a cache manager for transferring data into and out of the cache buffer, including retrieving data from a disk drive and storing said data into the cache buffer, the disk drive comprising a data disk having a plurality of concentric data tracks thereon, a spindle motor for rotating the data disk, and a transducer supported by a carrier for positioning the transducer over a selected data track to write data thereto or read data therefrom, a method of data transfer in response to a request for retrieving a set of data blocks from the selected track, comprising the steps of:
  (a) defining a data segment comprising, in sequence: (1) a pre-fetch data area on the selected track, (2) a fetch data area comprising said set of data blocks on the selected track, and (3) a post-fetch data area spanning at least a portion of the selected track and at least a portion of at least one succeeding track to the selected track, wherein the post-fetch area includes a first segment in said portion of the selected track and a second segment in said potion of said succeeding track; and
  (b) determining a landing position of the transducer over the selected track relative to the data segment; and
  (c) controlling transfer of data from the data segment to the cache buffer based on said landing position, wherein:
    (1) if said landing position is inside the data segment, commencing reading data from said landing position in the data segment without delay; and
    (2) otherwise, if said landing position is outside the data segment: (i) positioning the transducer over said succeeding track, (ii) determining the position of the transducer over said succeeding track relative to the data segment, (iii) if the transducer position is within the post-fetch area, commencing reading data from said transducer position in the post-fetch area without delay, otherwise, (iv) delaying reading data from the data segment until the post-fetch data area rotates under the transducer, thereafter commencing reading data from the post-fetch area.

44. The method of claim 43, further comprising the steps of, after reading data from the post-fetch area in said succeeding track is complete, positioning the transducer over a location in said selected track, wherein: (a) if said transducer location is at or before the beginning of the fetch area, transfer of data further comprises reading data from said transducer location to at least the end of the fetch data area, and (b) if said transducer location in the selected track is within or after the fetch data area, the step of data transfer further comprises: (1) continuing reading data from said transducer location in the data segment to the end of the first segment of the post-fetch area in the selected track, (2) thereafter, delaying reading from the selected track until the pre-fetch data area rotates under the transducer, thereafter commencing reading data from the pre-fetch area to at least said transducer location.

45. The method of claim 43, wherein if said landing position in the selected track is within or after the fetch data area, the step of controlling transfer of data further comprises: (a) continuing reading data from the landing position in the data segment to the end of the first segment of the post-fetch area in the selected track, (b) thereafter, delaying reading from the selected track until the pre-fetch data area rotates under the transducer, thereafter commencing reading data from the pre-fetch area to at least said landing position.

46. The method of claim 43, wherein if said landing position in the selected track is at or before the beginning of the fetch area, the step of controlling transfer of data further comprises reading data from said landing position to at least the end of the fetch data area.

47. The method of claim 43, wherein the post-fetch area includes a first segment in said portion of the selected track and a second segment in said potion of said succeeding track and wherein if said landing position in the selected track is within or after the fetch data area, the step of controlling transfer of data further comprises: (a) continuing reading data from the landing position in the data segment to the end of the first segment of the post-fetch area in the selected track, (b) thereafter, delaying reading from the selected track until the pre-fetch data area rotates under the transducer, thereafter commencing reading data from the pre-fetch area to at least said landing position.

48. The method of claim 43 further comprising the steps of:
  (a) allocating a cache segment in the cache buffer for storing data read from the data segment;
  (b) overwriting at least a portion of the cache segment with data read from the data segment; and
  (c) deallocating any remaining portion of the cache segment not overwritten with data from the data segment.

49. The method of claim 48, wherein the step of allocating the cache segment comprises selecting a size for the cache segment at most equal to the size of the data segment.

50. The method of claim 43, wherein the pre-fetch data area is adjacent to the fetch data area.

51. The method of claim 43, wherein the fetch data area is adjacent to the post-fetch data area.

52. The method of claim 43, wherein the step of defining the data segment further includes selecting a size of the pre-fetch data area as a function of the size of the cache buffer to maximize a hit ratio of the data in the cache buffer.

53. The method of claim 43, wherein the step of defining the data segment further includes selecting a size of the post-fetch data area as a function of the size of the cache buffer to maximize a hit ratio of the data in the cache buffer.

54. A cache manager for managing data transfer between a disk drive and a cache buffer including a plurality of data blocks for storing data, the data disk drive including a data disk with a plurality of concentric data tracks thereon, a spindle motor for rotating the data disk, and a transducer supported by a carrier for moving the transducer radially across the data disk to write data to or read data from the data tracks, the cache manager comprising a logic circuit interconnected to the disk drive and to the cache buffer, wherein the logic circuit is configured by program instructions such that in response to a request for retrieving a set of data blocks from the data disk, the logic circuit performs steps including:

(a) selecting a track on the data disk where said set of data blocks reside;

(b) defining a data segment comprising, in sequence: (1) a pre-fetch data area on the selected track, (2) a fetch data area comprising said set of data blocks on the selected track, and (3) a post-fetch data area spanning at least a portion of the selected track and at least a portion of at least one succeeding track to the selected track;

(c) directing the carrier to position the transducer over the selected track;

(d) determining a landing position of the transducer over the selected track relative to the data segment; and (e) controlling transfer of data from the data segment to the cache buffer based on said landing position, wherein:

(1) if said landing position is inside the data segment, commencing reading data from said landing position in the data segment without delay; and (2) otherwise, if said landing position is outside the data segment: (i) positioning the transducer over said succeeding track, (ii) determining the position of the transducer over said succeeding track relative to the data segment, (iii) if the transducer position is within the post-fetch area, commencing reading data from said transducer position in the post-fetch area without delay, otherwise, (iv) delaying reading data from the data segment until the post-fetch data area rotates under the transducer, thereafter commencing reading data from the post-fetch area.

55. The cache manager of claim 54, wherein the program instructions for controlling transfer of data include instructions for determining if said landing position in the selected track is at or before the beginning of the fetch area in the data segment, and if so, reading data from said landing position to at least the end of the fetch data area.

56. The cache manager of claim 54, wherein the post-fetch area includes a first segment in said portion of the selected track and a second segment in said potion of said succeeding track, and wherein the program instructions for controlling transfer of data include instructions for determining if said landing position in the selected track is within or after the fetch data area in the data segment, and if so: (a) continuing reading data from the landing position in the data segment to the end of the first segment of the post-fetch data area in the selected segment, and (b) thereafter, delaying reading from the selected track until the pre-fetch data area rotates under the transducer, thereafter commencing reading data from the pre-fetch area to at least said landing position.

57. The cache manager of claim 54 further comprising program instructions for configuring the logic circuit for:

(a) allocating a cache segment in the cache buffer for storing data read from the data segment;

(b) overwriting at least a portion of the cache segment with data read from the data segment; and (c) deallocating any remaining portion of the cache segment not overwritten with data from the data segment.

58. The cache manager of claim 57, wherein the program instructions for allocating the cache segment comprise instructions for selecting a size for the cache segment at most equal to the size of the data segment.

59. The cache manager of claim 54, wherein the pre-fetch data area is adjacent to the fetch data area.

60. The cache manager of claim 54, wherein the fetch data area is adjacent to the post-fetch data area.

61. The cache manager of claim 54, wherein the program instructions for defining the data segment further include instructions for selecting a size of the pre-fetch data area as a function of the size of the cache buffer to maximize a hit ratio of the data in the cache buffer.

62. The cache manager of claim 54, wherein the program instructions for defining the data segment further include instructions for selecting a size of the post-fetch data area as a function of the size of the cache buffer to maximize a hit ratio of the data in the cache buffer.

* * * * *

UNITED STATES PATENT AND TRADEMARK OFFICE
CERTIFICATE OF CORRECTION

PATENT NO.    : 6,209,058 B1
DATED         : March 27, 2001
INVENTOR(S)   : Shats et al.

It is certified that error appears in the above-identified patent and that said Letters Patent is hereby corrected as shown below:

<u>Column 17, claim 43,</u>
Line 40, replace "potion" with -- portion --.

<u>Column 18, claim 47,</u>
Line 28, replace "potion" with -- portion --.

<u>Column 20, claim 56,</u>
Line 3, replace "potion" with -- portion --.

Signed and Sealed this

Twenty-sixth Day of March, 2002

Attest:

JAMES E. ROGAN
*Attesting Officer*           *Director of the United States Patent and Trademark Office*